US012725181B1

(12) United States Patent
Wiles et al.

(10) Patent No.: US 12,725,181 B1
(45) Date of Patent: Sep. 1, 2026

(54) SYSTEM AND METHOD FOR OPTIMIZING, MANAGING, AND TRACKING OF ADVERTISING

(71) Applicants: Brian C Wiles, Mint Hill, NC (US); Edwin A. Okerson, Plano, TX (US)

(72) Inventors: Brian C Wiles, Mint Hill, NC (US); Edwin A. Okerson, Plano, TX (US)

( * ) Notice: Subject to any disclaimer, the term of this patent is extended or adjusted under 35 U.S.C. 154(b) by 0 days.

(21) Appl. No.: 19/051,112

(22) Filed: Feb. 11, 2025

Related U.S. Application Data

(63) Continuation-in-part of application No. 17/884,266, filed on Aug. 9, 2022, now abandoned.

(60) Provisional application No. 63/347,922, filed on Jun. 1, 2022.

(51) Int. Cl.
*G06Q 30/0242* (2023.01)
*G06K 7/14* (2006.01)

(52) U.S. Cl.
CPC ....... *G06Q 30/0244* (2013.01); *G06K 7/1417* (2013.01); *G06Q 30/0246* (2013.01)

(58) Field of Classification Search
CPC ........... G06Q 30/0244; G06Q 30/0246; G06K 7/1417
See application file for complete search history.

(56) References Cited

U.S. PATENT DOCUMENTS

2005/0166224 A1* 7/2005 Ficco .................. H04N 21/242 725/35
2011/0106597 A1* 5/2011 Ferdman ........... G06Q 30/0241 235/375
2012/0151524 A1* 6/2012 Kilaru ............... G06Q 30/0241 725/35
2018/0075478 A1* 3/2018 Rogas ................ H04L 63/1425
2022/0141515 A1* 5/2022 Grover ................ H04N 21/812 725/32
2025/0165953 A1* 5/2025 Kim .................. G06Q 30/0623

OTHER PUBLICATIONS

"How to Optimize QR Codes for Display Size and Scanning Distance" (published on Aug. 2, 2021 at https://pureoxygenlabs.com/how-to-optimize-qr-codes-for-display-and-scanning-distance/) (Year: 2021).*

* cited by examiner

*Primary Examiner* — James M Detweiler

(57) ABSTRACT

A system and method for managing advertisements is disclosed. The system generates a unique QR code for each airing of an advertisement based on parameters such as air time, station, location, viewer demographics, and media content type. The unique QR codes are associated with the advertisements and distributed for display on consumer displays. The system tracks user engagement with the advertisements by receiving scan data of the unique QR codes from user devices and provides the tracked data to the user. This allows for precise tracking and analysis of user engagement with individual advertisement airings.

1 Claim, 5 Drawing Sheets

SYSTEM AND METHOD FOR OPTIMIZING, MANAGING, AND TRACKING OF ADVERTISING

CROSS-REFERENCES TO RELATED APPLICATIONS

This application is a continuation-in-part of U.S. patent application Ser. No. 17/884,266, filed on Aug. 9, 2022, which claims the benefit of U.S. Provisional Application No. 63/347,922, filed on Jun. 1, 2022.

BACKGROUND

1. Field of the Invention

The present invention relates generally to systems and methods for advertising in broadcast media, and more specifically, to a system and method for optimizing the buying, selling, scheduling, airing, invoicing, and tracking of advertising in media outlets.

2. Description of Related Art

For many decades traditional broadcast media generate revenue largely through sales of advertising spots to businesses looking for exposure to consumers. One type of advertisement employed by traditional broadcast media are snipes, also called Overlay Ads. A snipe is a type of advertisement that "pops" up-usually at the bottom of the screen-during a television program. Snipes are frequently used to promote television stations or show promos.

Conventional snipe advertising, however, are not free of limitations. For example, implementing a snipe on air is time consuming and technically challenging. Additionally, it is difficult to reconcile the invoicing of conventional snipes with ad agencies and advertisers. In order to properly invoice an advertiser for a snipe, a virtual one-second commercial on the invoice is created since current technology supports only a traditional television commercial spot. Furthermore, tracking the performance (i.e., the response rate) of advertisements is difficult, if not impossible, as there are no current methods of determining whether a consumer sought goods or services due to conventional advertising exposure.

Accordingly, it is an object of the present invention to provide a system and method for optimizing the buying, selling, scheduling, airing, and invoicing of advertising in media outlets, thereby providing for a cost-effective method of employing commercial snipes.

A second object of the present invention is to provide a system for tracking advertising performance for all types of advertisements across multiple media outlets, whether they are over-the-air television broadcasts or other mediums such as streaming media over the Internet and digital advertisements on websites. This is accomplished through the novel generation of QR codes and other trackable assets.

A third object of the present invention is a system for the measurement of audience viewership and response rates of advertisements through the use of on-device detection and reporting of trackable advertisements.

Finally, a fourth object of the present invention is a system for enabling the interaction between viewers of advertisements and the advertisers via the same on-device detection of advertisements.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
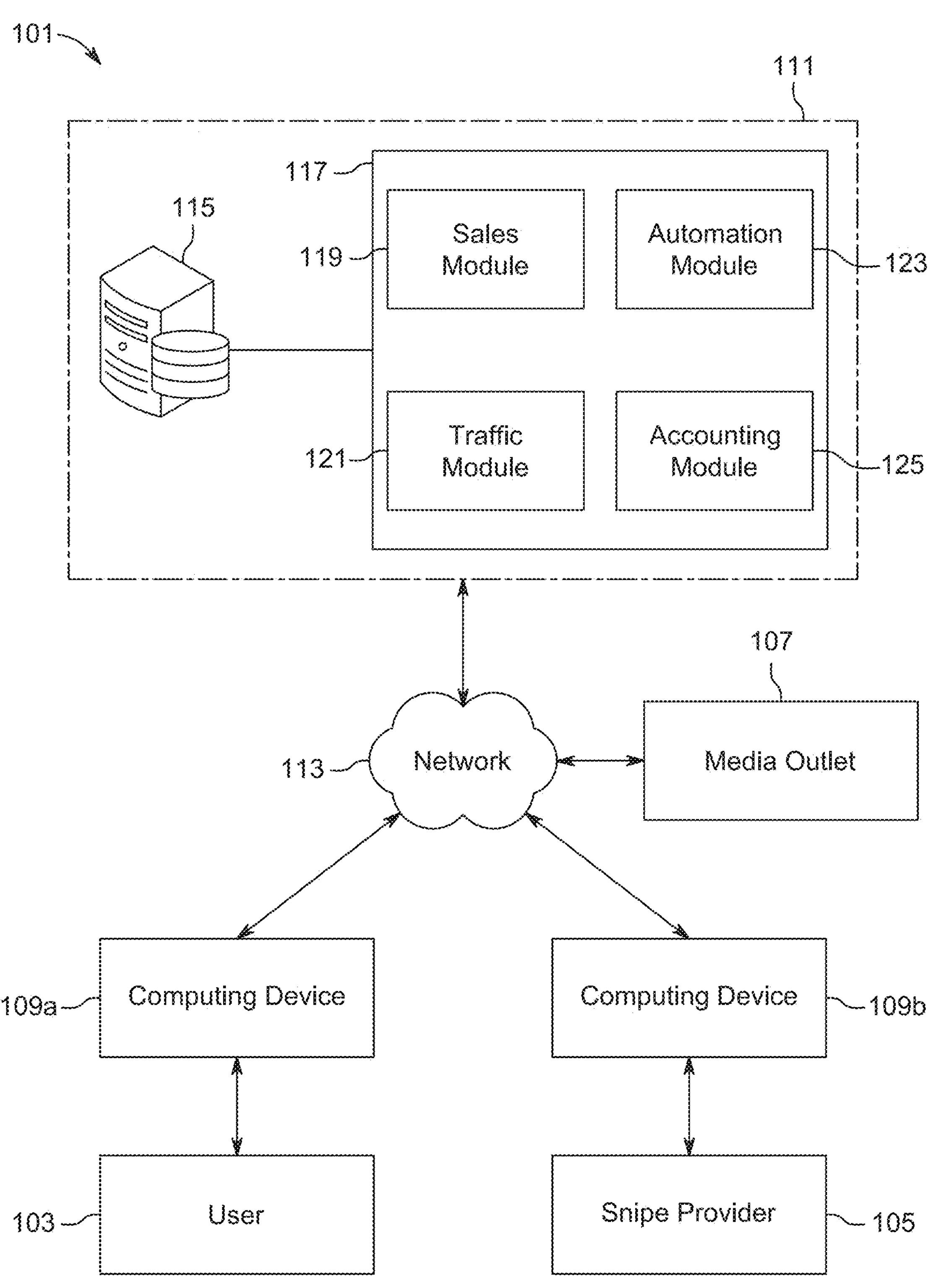
FIG. 1 is a schematic representation of an advertising system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional snipe advertising. Specifically, the present invention provides a means for generating revenue and invoicing of snipe advertising efficiently. In addition, the present invention aims to implement scheduling and airing of snipes in various media outlets such as television, Internet websites, mobile phones, digital billboards, and the like, thereby allowing businesses to track the performance of snipe advertising. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Reference in the specification to "snipe" or "snipes" should be understood to include any graphical image, video, or other animated advertisement overlaid onto media content that does not interrupt the media content.

Referring now to the drawings wherein like reference characters identify corresponding or similar elements throughout the several views, FIG. 1 depicts a schematic representation of an advertising system 101 in accordance with a preferred embodiment of the present application. It will be appreciated that the advertising system 101 overcomes one or more of the above-listed problems commonly associated with conventional snipe advertising.

In the contemplated embodiment, the advertising system 101 includes at least one user 103, at least one snipe provider 105, and at least one media outlet 107. The user 103 and the snipe provider 105 engages with at least one computing device (e.g., computing device 109*a*, 109*b*; collectively referred to as computing device 109) for accessing a platform 111 via a network 113. It should be understood that the advertising system 101, as described herein, is an exemplary system that is useful for implementing various aspects of the present invention.

It should be noted that the user 103 is (typically an ad agency or advertiser) any party seeking to place an order for a snipe, including one or more individuals, business entities or a combination thereof.

It should be noted that the snipe provider 105 refers to one or more individuals, business entities or a combination thereof that offers the sale, scheduling, airing, and invoicing of snipe advertising in media outlets.

It should be noted that the media outlet 107 refers to any broadcasting medium that offers media content by way of television, the Internet, or both.

The computing device 109 is configured to transmit and receive data from the platform 111 via the network 113. It should be noted that the computing device 109 may correspond to one or more personal computers, laptop computers, personal digital assistants, tablet computers, mobile phones, portable media players, digital media receivers, set-top boxes, video game consoles, any other network-enabled electronic devices, or any combination or multiplicity thereof. In other embodiments, the computing device 109 is a computing system such as the exemplary system shown in FIG. 2.

The platform 111 is configured to manage network resources, store information, data processing, execute various operations and functions, and the like needed to implement the methodologies discussed herein. The platform 111 includes one or more servers 115 containing data 117 to apply the current invention. Examples of the one or more servers 115 include, without limitation, a web server, an application programming interface (API) request server, a database server, and any combination or multiplicity thereof.

It will be appreciated that the platform 111 also provides a user interface to facilitate user operation thereof. The user interface may utilize a software application, a browser application, a web browser, a webpage, a website, or any combination or multiplicity thereof.

The network 113 includes one or more wired telecommunications, wireless telecommunications, or any combination or multiplicity thereof by which the computing devices 109 may exchange data. The network 113 may include, for example, one or more of a local area network (LAN), a wide area network (WAN), an intranet, an Internet, a public switched telephone network (PSTN), a metropolitan area network (MAN), a cellular or other mobile communication network, a BLUETOOTH® wireless technology connection, a wireless local area network (WLAN), a virtual private network (VPN) a near field communication (NFC) connection, and any combination or multiplicity thereof.

Data 117 will include at least a sales module 119, a traffic module 121, an automation module 123, and an accounting module 125. It will be appreciated that modules 119-125 contain a graphical user interface with which a user operates modules 119-125.

Sales

The sales module 119 can include information associated with sale orders for one or more snipe advertisements. The user 103 can contact the snipe provider 105 directly to place an order or through the platform 111. Through the platform 111, the user 103 can upload a graphic image or video of a desired snipe.

The user 103 can choose one or more metrics for airing the desired snipe. For example, the user 103 can select a time interval (e.g., daypart), frequency (e.g., 10 times over 5 days), and/or specific shows, programs or other media content to air the desired snipe. In addition, the user 103 can specify the segment of the show (e.g., top, middle, or end of the show) to air the desired snipe.

The user 103 can also select a target audience through viewer demographics (e.g., age, gender, income level, etc.) and/or designated market areas (e.g., local, statewide, nationwide, etc.).

The sales module 119 can also display pricing so that the user 103 can find the best value for their needs. Pricing for a desired snipe can vary depending on various factors such as station size, daypart, show popularity, time of year, how far in advance the sale order is placed, demand for specific slots, and the like.

After selecting the criteria for the desired snipe, the user 103 receives a confirmation of their selection, pricing, and the like. The user 103 may also receive an invoice to be paid in advance, depending upon any pre-arranged credit terms with the media outlet 107 and/or the snipe provider 105.

Traffic

The traffic module 121 manages information associated with scheduling and media content. The traffic module 121 is designed to be completely automated but also allows the snipe provider 105 to override every parameter or manually schedule individual snipes within a show and/or commercial break.

The snipe provider 105 can obtain the schedule of the media outlet 107 and media content available for advertisements. In some embodiments, the snipe provider 105 can utilize a media outlet's source codes to categorize available and restricted content.

The traffic module 121 also determines the timing of a snipe as needed to accommodate a show's schedule and duration and/or user selected metrics. For example, when a show's first segment is longer than expected thereby making the second segment shorter, the traffic module 121 can rearrange the airing of snipes within each segment.

Automation

The automation module 123, commonly known as playback automation, generates the desired snipe that will be broadcast to viewers via the media outlet 107. The automation module 123 is designed to automatically input the snipe during a show but also allows the snipe provider 105 to intervene as needed. For example, the snipe provider 105 can interact with and control the automation module 123 to rearrange the airing of snipes when a show airs longer than scheduled.

Accounting

The accounting module 125 manages all of the accounting and billing functions of the advertising system 101. The advertising system 101 ensures that all billing is completely accurate in cases where a snipe does not air as scheduled or a modification is made after the sales order is finalized.

The accounting module 125 can generate invoices daily, weekly, or at the end of any other billing cycle. Each invoice includes an itemized list of what the user 103 selected for their desired snipe.

The accounting module 125 also verifies whether a snipe did in fact air as requested. The user 103 is notified whether or not the snipe was aired as scheduled. If the snipe was not aired as scheduled, the accounting module 125 will send a credit (i.e., a "make-good") to the user 103 so that the user 103 can choose a replacement time to air the snipe again.

The snipe provider 105 can override the accounting module 125 and adjust the invoice of the user's account manually as well. The snipe provider 105 can also provide discounts, set payment terms, and other accounting functions as necessary.

Payments can be received from the user 103 via traditional methods such as paper check or new methods such as Automated clearinghouse (ACH) payments. The accounting module 125 can be configured to automatically debit a client's bank account when payment is due.

It should also be appreciated that one of the unique features believed characteristic of the present application is that it provides an end-to-end handling of snipe advertising automatically and efficiently, thereby saving costs associated with scheduling and airing snipes.

Figure 2:
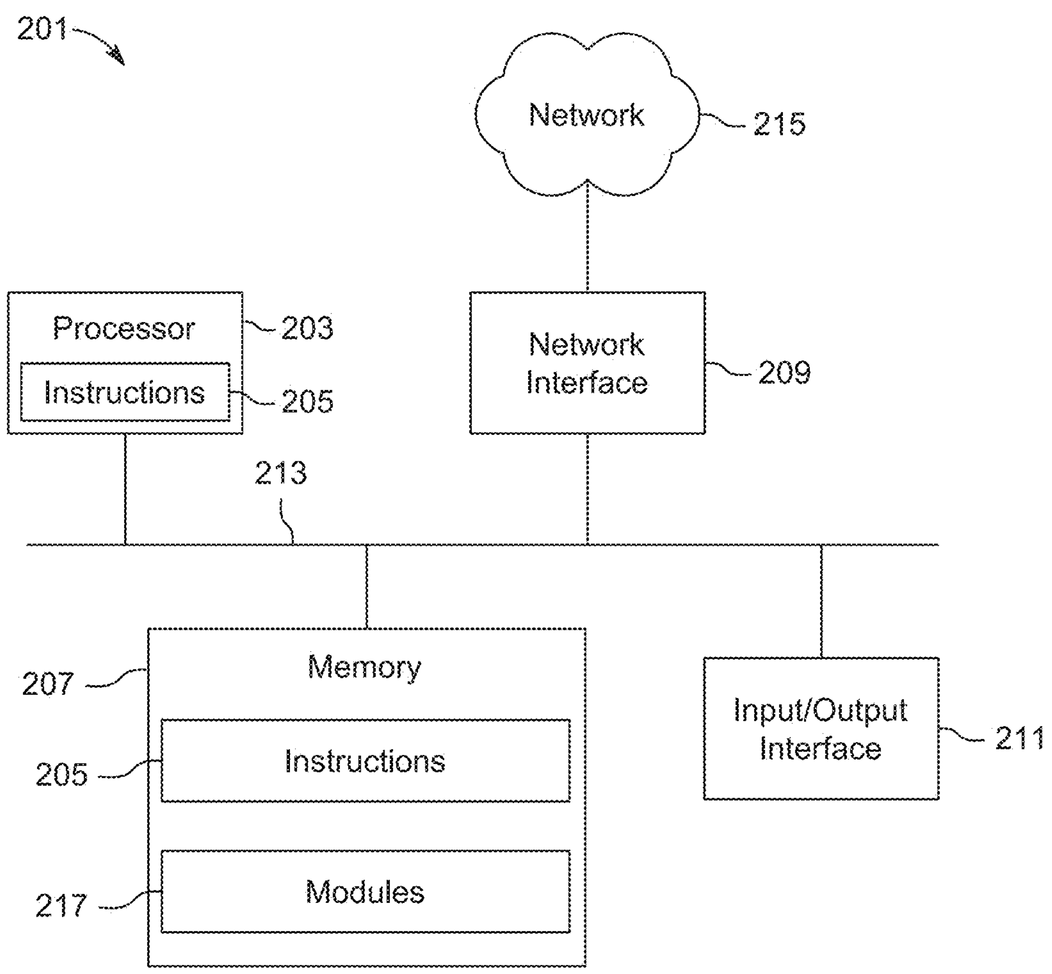
FIG. 2 is a schematic representation of an example computer system within which a set of instructions for causing a machine to perform any one or more of the methodologies discussed herein may be executed.

In FIG. 2, a schematic representation of a computer system 201 within which a set of instructions may be executed for causing a machine to perform any one or more of the methodologies discussed herein, is depicted. The computer system 201 may correspond to any of the various computing devices, servers, mobile devices, embedded systems, or computing systems presented herein.

The computer system 201 may be implemented as any of a variety of conventional computing devices, including, for example, a desktop computer, a laptop, a tablet, a phablet, a workstation, an embedded controller, a server, a mobile device, a smartphone, an entertainment device, a printing machine (also referred as a printer or a printing device), a set-top box, a kiosk, a vehicular information system, one or more processors associated with a television, a customized machine, any other hardware platform, or any combination or multiplicity thereof. The computer system 201 may be a distributed system configured to function using multiple computing machines interconnected via a data network or bus system. Further, while only a single machine is illustrated, the term "machine" shall also be taken to include any collection of machines that individually or jointly execute a set (or multiple sets) of instructions to perform any one or more of the methodologies discussed herein.

The computer system 201 includes at least one processor 203 with or without one or more sets of instructions 205, a memory 207 with or without one or more sets of instructions 205, a network interface 209, and an input/output interface 211 which communicate with each other via a bus 213.

The processor 203 may be configured to execute code or instructions to perform the operations and functionality described herein, manage request flow and address mappings, and to perform calculations and generate commands. The processor 203 may be configured to monitor and control the operation of the components in the computer system 201. The processor 203 may be a general-purpose processor, a processor core, a multiprocessor, a reconfigurable processor, a microcontroller, a digital processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 203 may be a single processing unit, multiple processing cores, special purpose processing cores, coprocessors, or any combination thereof. In addition, the processor 203 along with other components of the computer system 201 may be a virtualized computing machine executing within one or more other computing machines.

The processor 203 may also be connected to the other elements of the computer system 201 or the various peripherals discussed herein through the bus 213. It should be appreciated that the bus 213 may be within the processor 203, outside the processor 203, or both. In some embodiments, any of the processor 203, the other elements of the computer system 201, or the various peripherals discussed herein may be integrated into a single device, for example, a system on a chip (SOC), system on package (SOP), or application-specific integrated circuit (ASIC) device.

The instructions 205 may reside, completely or at least partially, within the processor 203 and/or memory 207 during execution thereof by the computer system 201. The instructions 205 may include directions for storing instructions, performing one or more functions, and the like. For example, the instructions 205 may include detecting one or more files to perform one or more methodologies described herein. The instructions 205 may be configured to run in sequential order, in parallel (such as under different processing threads) or in a combination thereof. The instructions 205 may further be transmitted or received over a network 215 using a transmission medium, for instance network interface 209, and any one of a number of well-known transfer protocols (e.g., HTTP, HTTPS, FTP, TCP, and the like).

The network interface 207 facilitates communication with other computing systems (not shown) via one or more networks 215. Other computing systems, for example, may include conventional computing devices as described above, internet connected devices/systems, or an external storage such as a server, or a cloud computing system.

The computer system 201 may operate in a networked environment using logical connections through the network interface 209 to one or more other systems or computing machines across the network 215. The network 215 may include wide area networks (WAN), local area networks (LAN), the Internet, intranets, wireless access networks, wired networks, mobile networks, telephone networks, near field communication (NFC), optical networks, or combinations thereof. The network 215 may be packet switched, circuit switched, of any topology, and may use any communication protocol. Communication links within the network 215 may involve various digital or analog communication media, for example, fiber optic cables, free-space optics, waveguides, electrical conductors, wireless links, antennas, radio frequency communications, and the like.

The memory 207 may include volatile memories, for example, random-access memory (RAM), static random-access memory (SRAM), dynamic random-access memory (DRAM), and synchronous dynamic random-access memory (SDRAM). Other types of RAM also may be used to implement the memory 207. The memory 207 may also include non-volatile memories, for example, read-only memory (ROM), erasable programmable read-only (EROM), flash memories, or any other device capable of storing program instructions or data with or without applied power. In addition, the memory 207 may include a non-volatile storage device, for example, a hard disk, a floppy disk, an optical disk, a compact disk read only memory (CD-ROM), a digital versatile disc (DVD), a Blu-ray disc, a magnetic tape, a flash memory, other non-volatile memory device, a solid state drive (SSD), any magnetic storage device, any optical storage device, any semiconductor storage device, any physical-based storage device, any other data storage device, or any combination or multiplicity thereof.

The memory 207 may also include one or more modules 217 configured to facilitate the computer system 201 with performing the methodologies described herein. The module 217 may include one or more sets of instructions 205 stored as software or firmware in association with the memory 207. The memory 207 may therefore represent examples of machine or computer readable media on which instructions or code may be stored for execution by the processor 203. Machine or computer readable media may generally refer to any medium or media used to provide instructions to the processor 203. Such machine or computer readable media associated with the module 217 may comprise a computer software product. It should be appreciated that a computer software product comprising the module 217 may also be associated with one or more processes or methods for delivering the module 217 to the computer system 201 via the network 215, any signal-bearing medium, or any other communication or delivery technology. The module 217 may also comprise hardware circuits or information for configuring hardware circuits, for example, microcode or configuration information for a FPGA or other PLD.

The input/output (I/O) interface 211 may couple the computer system 201 to various input devices including keyboards, mice, touchscreens, touchpads, trackballs, joysticks, cameras, microphones, scanners, electronic digitizers, sensors, receivers, wireless remotes, and any other pointing devices, or any combination thereof. The I/O interface 211 may couple the computer system 201 to various output devices including video displays, speakers, printers, projectors, tactile feedback devices, automation control, robotic components, and the like.

Figure 3:
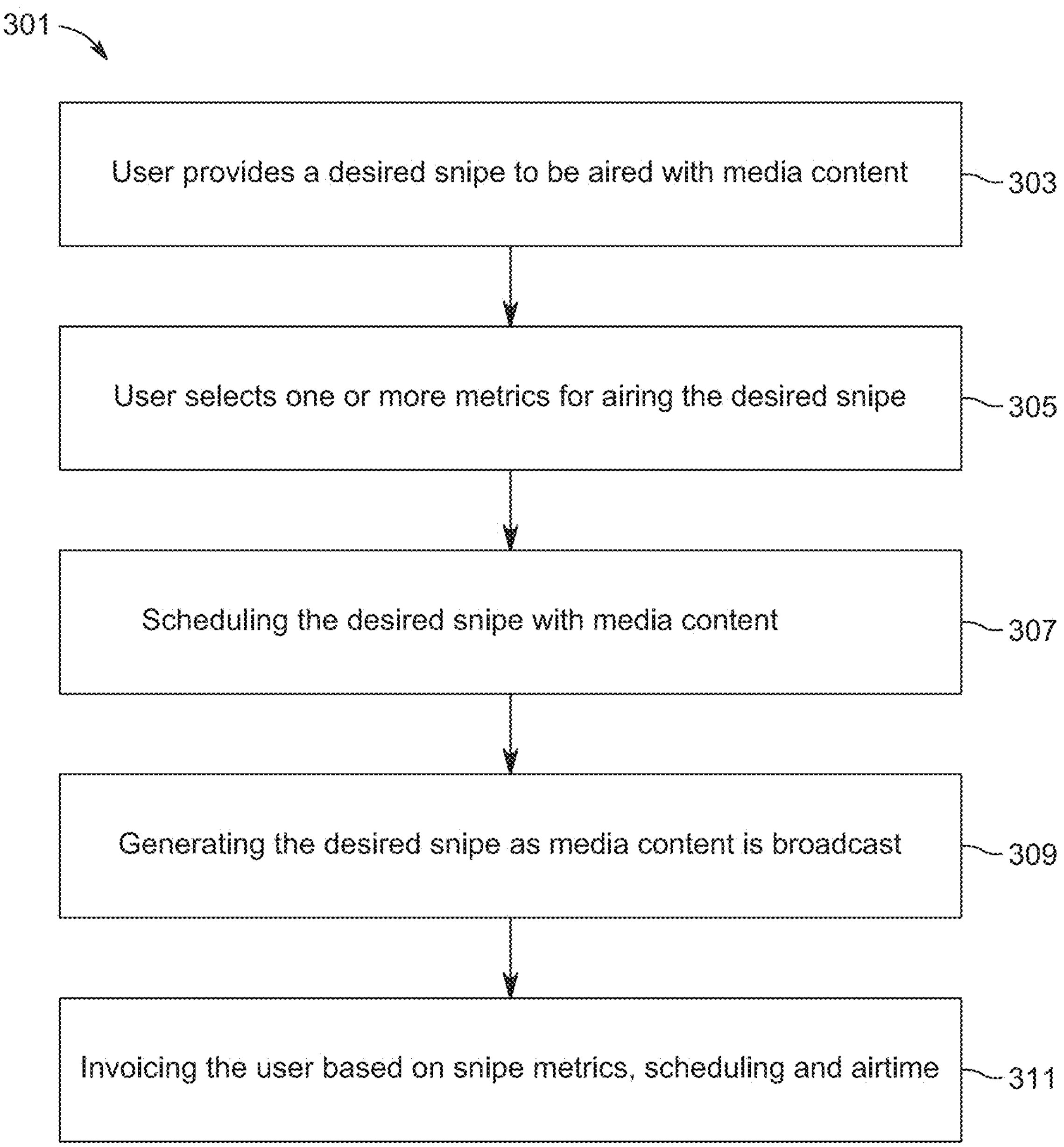
FIG. 3 is a flowchart of a method of operation of the advertising system of FIG. 1 in accordance with one or more embodiments of the present invention.

In FIG. 3, a flowchart 301 depicts a simplified method of operation associated with the advertising system 101. During operation, the user provides a desired snipe to be aired and selects one or more metrics for the desired snipe, as shown with boxes 303, 305. The system schedules the desired snipe with media content based on the one or more selected metrics, as shown with box 307. Next, the system generates the desired snipe as media content is broadcast, as shown with box 309. The system then invoices the user based on the snipe's metrics, scheduling, and airtime, as shown with box 311.

QR Code Generation and Tracking of Advertisements

Figure 4:
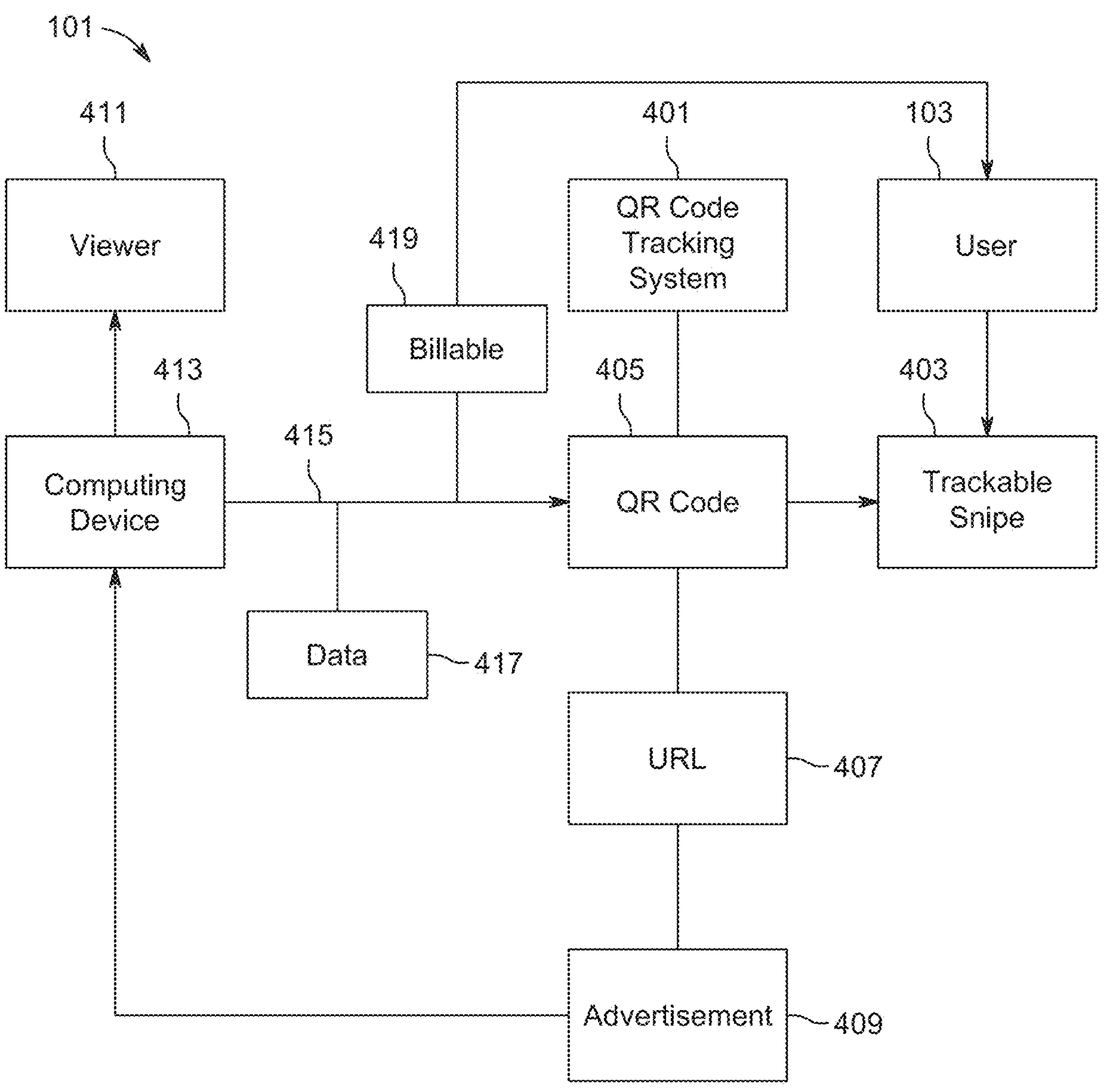
FIG. 4 is a schematic representation of features of a quick response (QR) code tracking system as part of the advertising system of FIG. 1 in accordance with one or more embodiments of the present invention.

In FIG. 4, a schematic representation of features of a quick response (QR) code tracking system 401 is illustrated. It will be appreciated that the QR code tracking system 401 is an example of a system architecture for implementing the embodiments of the advertising system 101.

The user 103 has an option to purchase a trackable advertisement 409. When a trackable advertisement 409 is purchased, the QR code tracking system 401 generates a QR code 405 each time the advertisement 409 is scheduled to be broadcast or otherwise shown to a viewer 411. The QR code 405 includes a Uniform Resource Locator (URL) 407 address which uniquely identifies a specific showing of a specific advertisement 409. The QR code 405 may be a graphic code, a barcode, a magnetic barcode, a character, other two-dimensional image, and the like. It should be appreciated that the QR code 405 provides for real-time verification of whether an advertisement 409 was broadcast as scheduled, off schedule (i.e., the advertisement 409 broadcast early or late), or not broadcast at all.

The QR code tracking system 401 generates a unique QR code 405 for each airing of a trackable advertisement 403. This unique QR code 405 is generated based on a combination of specific parameters, including air time, station, location, viewer demographics, and program content information. The system uses a proprietary algorithm to combine these parameters and generate a unique QR code for each airing. For example, an ad airing at 8:00 PM on Channel 4 in New York City on a Monday during a sports program would have a different QR code than the same ad airing at 9:00 PM on a Wednesday on the same channel during a news program. This allows for precise tracking of user engagement with each specific ad airing. The QR code 405 need not contain all of the details of the airing but can be a unique identifier of the specific airing instead.

The QR code 405 also contains a second unique code that protects against fraudulent activity such as spam clicks or scans. Since no external party can predict the value of the anti-fraud code from the unique airing ID, this prevents a malicious actor from generating large amounts of fraudulent ad responses. For example, the QR code 405 might contain the URL https://example.com/s/7890/5531 which refers to an airing with the ID of 7890, followed by an anti-fraud code of 5531. If the anti-fraud code does not match when the system 401 receives a request for that QR code 405's URL 407, the system 401 simply ignores the request to prevent invalid billing and/or tracking activity. This is similar to how digital ads are protected against fraudulent clicks.

To ensure the QR code 405 is scannable at large distances, the URL is kept as short as possible to adequately identify each unique airing while still using as few characters as possible. This also allows for including a custom logo while still having enough error correction data available to compensate for the data that is obscured by the logo.

During use, when the viewer 411 sees the QR code 405, the viewer 411 can use a computing device 413 such as a mobile phone to scan 415, click, or otherwise select and access the QR code 405 to view the advertisement 409. The advertisement 409 can be the user's business website, advertised good or service, event reminder, promotion, discount, or other information that the user 103 wants the viewer 411 to see.

Data 417 is collected each time the viewer 411 scans 415 the QR code 405. Data 417 may include the date and time of the scan, viewer demographic information, type of computing device used to view the advertisement 409, IP address, approximate location (e.g., city, state), specific media outlet broadcasting the advertisement 409, and other information. The data 417 also includes the actual air date and time of the advertisement 409 so that advertisers can see the exact time within the advertisement 409 the QR code 405 was scanned. This allows advertisers to optimize the effectiveness of the creative content of the advertisement 409 as well.

In some embodiments, each scan 415 can be billable 419 to the user 103. For example, an invoice may be generated periodically for any scans or clicks after an advertisement 409 is broadcast. In another example, the invoice may cover any scans or clicks within a specified time interval after the advertisement 409 is broadcast.

In some embodiments, the user 103 may provide their own QR code for their advertisement 409. The QR code tracking system 401 may replace the QR code with a new QR code that enables advertisement tracking.

Interactive Video Advertisements and Audience Measurement

Figure 5:
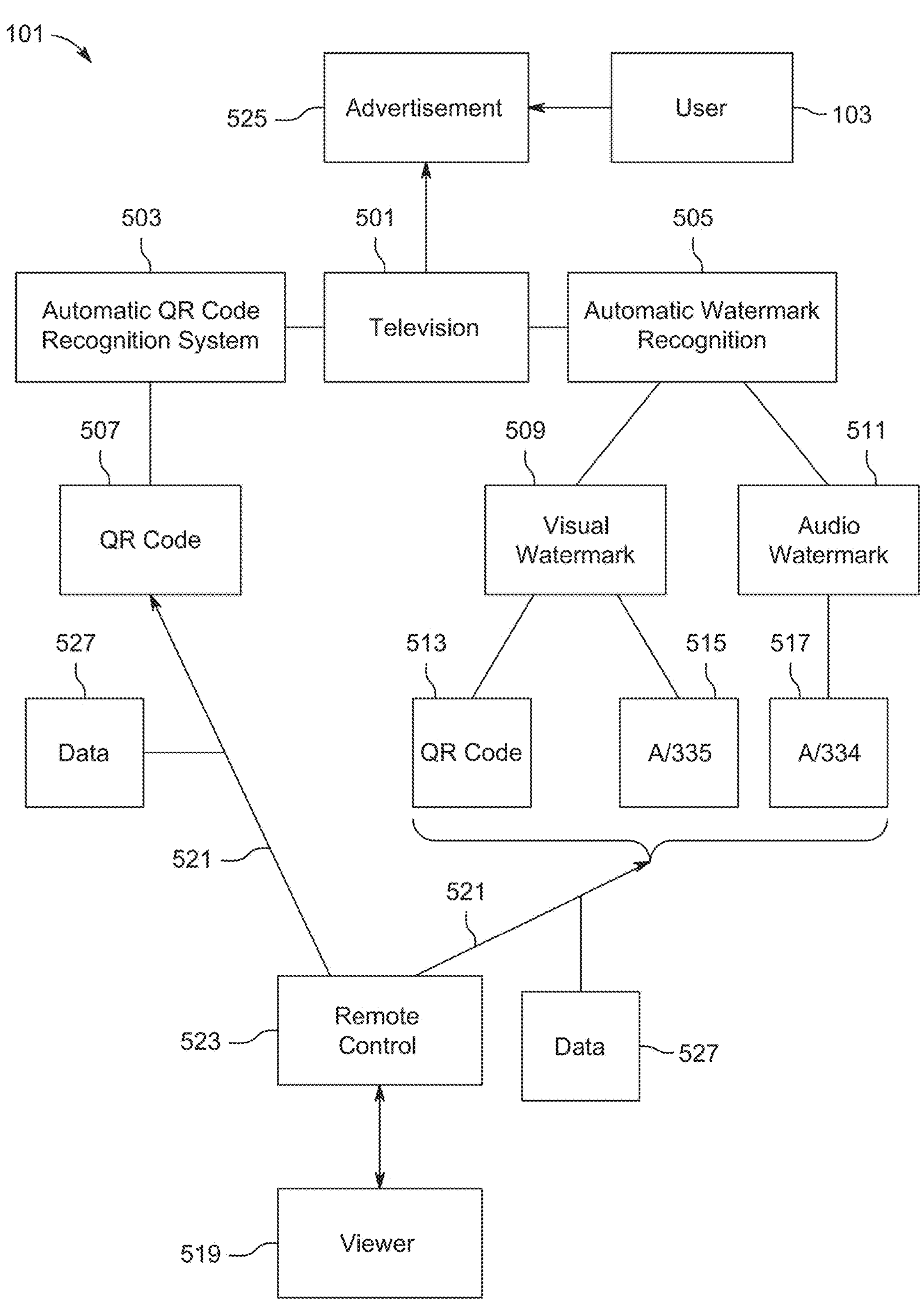
FIG. 5 is a schematic representation of features of a television as part of the advertising system of FIG. 1 in accordance with one or more embodiments of the present invention.

In FIG. 5, a schematic representation of features associated with a television 501 is illustrated. It will be appreciated that the television 501 is an example of a system architecture for implementing the embodiments of the advertising system 101.

As shown, the television 501 includes an automatic QR code recognition system 503 and an automatic watermark recognition system 505. The automatic QR code recognition system 503 is configured to automatically detect one or more QR codes 507 when broadcast on the television 501. The automatic watermark recognition system 505 is configured to automatically detect one or more visual watermarks 509, one or more audio watermarks 511, or both when broadcast on the television 501. Examples of visual watermarks 509 include a QR code 513 and an A/335 video watermark 515. Example of audio watermarks 511 includes an A/334 audio watermark 517. It should be understood that the QR code 507, the visual watermark 509, and the audio watermark 511 are encoded with a URL address which uniquely identifies a specific showing of a specific advertisement.

During use, when a viewer 519 sees a QR code 507, visual watermark 509, audio watermark 511, or a combination thereof broadcast on the television 501, the viewer 519 can click 521 or otherwise select one of the former through a remote control 523 or other device to view an advertisement 525. The advertisement 525 can be the user's business website, advertised good or service, event reminder, promotion, discount, or other information that the user 103 wants the viewer 519 to see.

Data 527 is collected each time the viewer 519 clicks 521 the QR code 507, visual watermark 509, audio watermark 511 or a combination thereof. Data 527 may include viewer demographic information, type of television used to view the advertisement 525 (e.g., Samsung, LG, Sony, etc.), approximate location (e.g., city, state), specific media outlet broadcasting the advertisement, and other information.

The television 501 may also be configured to automatically retrieve the URL encoded by the QR code 507, the visual watermark 509, the audio watermark 511, or a combination thereof every time one of the former is displayed, thereby facilitating viewer tracking regardless of whether or not the viewer 519 chooses to click 521 on one of the former to view the advertisement 525. After retrieving the URL from the QR code 507, the television 501 sends the URL and data 527 to the QR code tracking system 401 which counts that impression and stores the data 527 for later analysis. This allows the QR code tracking system 401 to more accurately measure the audience size as well as the response rate of the advertisement 525.

The automatic QR code recognition system 503, the automatic watermark recognition system 505 or both may also be used in other systems to automatically track and verify that the advertisement 525 was broadcast as scheduled, off schedule (i.e., the advertisement 525 broadcast early or late), or not broadcast at all.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method for managing advertisements in a broadcast media automation system, comprising:

receiving an advertisement from a user at a server comprising a processor and memory, wherein the advertisement is a snipe ad configured to graphically overlay a broadcast television media program without interrupting a video feed of the broadcast television media program;

generating a unique QR code for each specific airing instance of the advertisement using a processor, wherein the unique QR code is generated based on at least one parameter associated with the specific airing instance, the parameter selected from the group consisting of:

air time, media outlet, location, viewer demographics, and media content type;

wherein generating the unique QR code comprises generating and encoding within the unique QR code a Uniform Resource Locator (URL) containing a first code comprising a unique airing identifier for the specific airing instance, and a second code comprising a unique anti-fraud code to prevent external prediction of valid URL requests, wherein the first code and second code are distinct from one another;

associating the unique QR code with the advertisement prior to broadcast;

generating a server-side record tied to the unique airing identifier, wherein the server-side record comprises the unique anti-fraud code;

dynamically broadcasting the advertisement for display on a consumer display as a specific airing instance of the advertisement in synchronization with the broadcast television media program based at least in part on a comparison between a determined segment length of the broadcast television media program relative to at least a scheduled segment length or an expected segment of the broadcast television media program, the dynamically broadcast advertisement including the associated unique QR code;

receiving a URL request comprising scan data of the associated unique QR code from a user device at the server as a result of displaying the specific airing instance of the advertisement on the consumer display;

validating the scan data by identifying the unique anti-fraud code from the received URL request and determining whether the identified unique anti-fraud code matches the unique anti-fraud code in the server-side record tied to the unique airing identifier, and ignoring the URL request if the identified unique anti-fraud code does not match to prevent invalid tracking activity;

tracking user engagement with the dynamically broadcast advertisement based on the validated scan data to conduct billing reconciliation without generating a virtual one-second commercial spot; and providing the user with data indicating the tracked user engagement.

* * * * *